US009291884B2

United States Patent
Chen et al.

(10) Patent No.: US 9,291,884 B2
(45) Date of Patent: Mar. 22, 2016

(54) METHOD OF REGULATING LIGHT WAVELENGTH FOR PROJECTION DEVICE

(71) Applicant: DELTA ELECTRONICS, INC., Taoyuan Hsien (TW)

(72) Inventors: Wei-Ting Chen, Taoyuan Hsien (TW); Che-Hao Fan, Taoyuan Hsien (TW); Ru-Shi Liu, Taoyuan Hsien (TW); Keh-Su Chang, Taoyuan Hsien (TW); Chi Chen, Taoyuan Hsien (TW); Yen-I Chou, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 126 days.

(21) Appl. No.: 14/041,803

(22) Filed: Sep. 30, 2013

(65) Prior Publication Data

US 2014/0333908 A1    Nov. 13, 2014

(30) Foreign Application Priority Data

May 7, 2013    (TW) .............................. 102116130 A

(51) Int. Cl.
*G03B 21/20* (2006.01)
*H04N 9/31* (2006.01)
*G03B 33/04* (2006.01)
*G03B 33/12* (2006.01)

(52) U.S. Cl.
CPC .............. *G03B 21/204* (2013.01); *G03B 33/04* (2013.01); *G03B 33/12* (2013.01); *H04N 9/3111* (2013.01); *H04N 9/3158* (2013.01); *H04N 9/3182* (2013.01)

(58) Field of Classification Search
CPC ............. G03B 21/204; G03B 21/2053; G03B 21/2013; H04N 9/3164; H04N 9/3161; H04N 9/3155; H04N 9/3158
See application file for complete search history.

(56) References Cited

U.S. PATENT DOCUMENTS

| 7,833,436 | B2* | 11/2010 | Shimooka et al. ....... 252/301.4 F |
| 2011/0051095 | A1* | 3/2011 | Narimatsu et al. ............. 353/31 |
| 2012/0050691 | A1* | 3/2012 | Tsuda et al. ................... 353/31 |
| 2013/0044296 | A1 | 2/2013 | Hsu et al. | |

FOREIGN PATENT DOCUMENTS

| CN | 102650812 | 8/2012 |
| TW | 200601369 | 1/2006 |
| TW | 201209507 | 3/2012 |
| TW | 201314344 | 4/2013 |
| WO | 2009/016096 A1 | 2/2009 |
| WO | 2009/017206 A1 | 2/2009 |

* cited by examiner

*Primary Examiner* — William C Dowling
*Assistant Examiner* — Ryan Howard
(74) *Attorney, Agent, or Firm* — Hauptman Ham, LLP

(57) ABSTRACT

The disclosure provides a method for regulating a light wavelength of a projection device. The method comprises the following steps. A single-color light source is provided and emits a first chromatic light. A phosphor layer is formed on an optical path of the single-color light source, so that the first chromatic light transmits the phosphor layer. The phosphor layer transforms a part of the first chromatic light to a second chromatic light, and emits the residual first chromatic light. The residual first chromatic light is further mixed with the second chromatic light to generate a third chromatic light. The wavelength of the third chromatic light is regulated by adjusting the proportion of the luminous intensity of the residual first chromatic light and the second chromatic light.

11 Claims, 10 Drawing Sheets

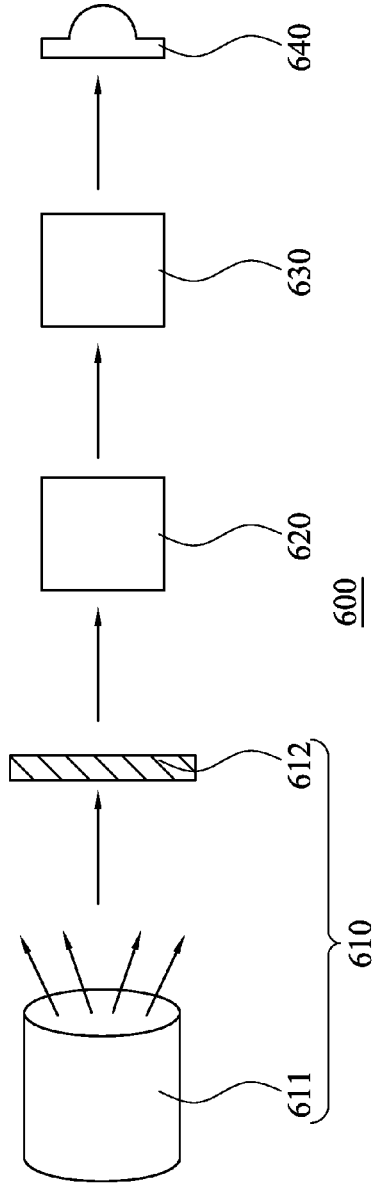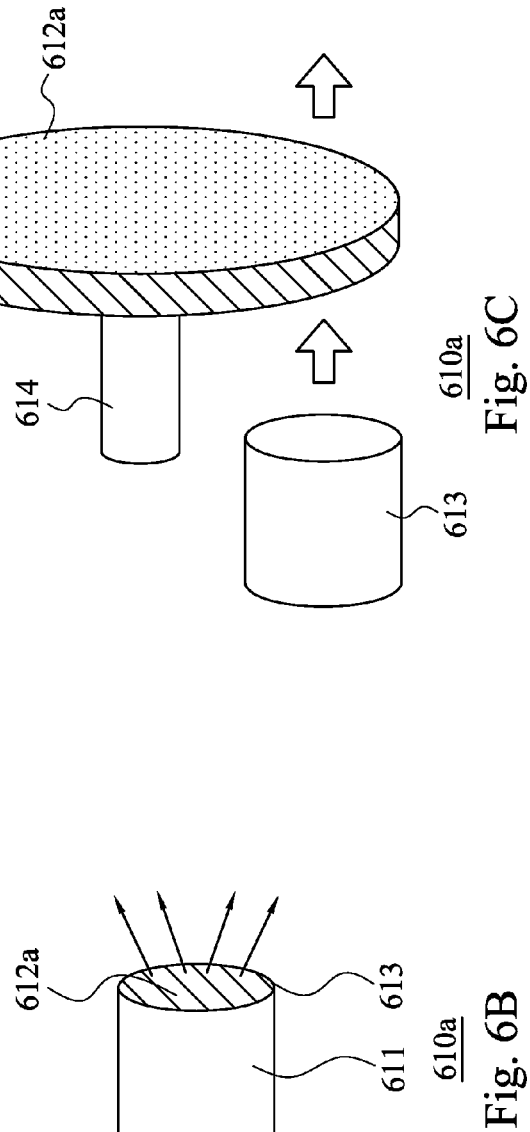

METHOD OF REGULATING LIGHT WAVELENGTH FOR PROJECTION DEVICE

This application claims priority to Taiwan Application Serial Number 102116130, filed May 7, 2013, which is herein incorporated by reference.

BACKGROUND

1. Technical Field

The present disclosure relates to a method of regulating light wavelength, to and more particularly, to a method of regulating light wavelength for a projection device.

2. Description of Related Art

In a laser projector, the optical path design of a light source module is generally designed by transmitting a single-color light through a phosphor wheel (PW) so as to excite red, yellow, or green phosphors as a light source for display. And then, the light sequentially passes through a relay, a light modulator and projection lens to emit a specific color light as a light source.

FIG. 1 is a schematic view of a light source module 100 of a general 445-nm laser projector. In FIG. 1, a 445-nm blue light source 110 first emits a blue light 111, so that the blue light 111 enters a phosphor wheel 120 and excites a phosphor layer 121, to generate another color light 122 with a longer wavelength. The residual blue light 111 may enter the projector through another optical path as a blue light source.

However, the general 445-nm laser light source presents purplish (the left side of FIG. 2A), and has an obvious color difference from the standard blue light source provided in Rec. 709 (the right side of FIG. 2A), as shown in FIG. 2A. The CIE (International Commission on Illumination) coordinate (x, y) of the general 445-nm laser light source is (0.13, 0.03) (point 210 in FIG. 2B), which is different from the CIE coordinate (0.15, 0.06) (point 220 in FIG. 2B) of Rec. 709, as shown in FIG. 2B. Such phenomenon may seriously impact the display gamut of a projector, and generate a serious color shift in blue color.

Currently, 445-nm blue has been used to excite a green phosphor to to generate a cyan light. And, the cyan light in a specific range of wavelength is screened by a filter, and mixed with 445-nm blue light to adjust the blue color. However, such light-mixing method needs an additional cyan-light filter and the change in the optical pathway of the original light source, such that extra components and product cost are involved. Further, the aforementioned method still cannot efficiently adjust the blue light source to conform the CIE coordinate of Rec. 709.

Therefore, there is a need for an improved method of regulating light wavelength for a projection device, so as to solve the color shift of the conventional blue light source met in the art.

SUMMARY

The present disclosure provides a method of regulating light wavelength for a projection device, to solve the color shift of the conventional blue light source, so as to approach the CIE coordinate of Rec. 709, and enhance the color rendering.

One embodiment of the present disclosure is to provide a method of regulating light wavelength for a projection device. The method comprises providing a single-color light source emitting a first chromatic light; forming a phosphor layer on an optical pathway of the single-color light source, so that the first chromatic light transmits the phosphor layer; transforming a part of the first chromatic light to a second chromatic light through the phosphor layer, and emitting the residual first chromatic light, wherein the wavelength of the second chromatic light is longer than the wavelength of the first chromatic light; and mixing the residual first chromatic light and the second chromatic light to generate a third chromatic light, wherein the wavelength of the third chromatic light is between the first and the second chromatic lights, and the wavelength of the third chromatic light is regulated by adjusting the proportion of the luminous intensity of the residual first chromatic light and the second chromatic light.

According to one example of the present disclosure, the projection is device comprises a light providing device, a relay, a light modulator, and a projection lens, wherein the light providing device comprises the single-color light source and the phosphor layer.

According to one example of the present disclosure, the phosphor layer of the light providing device is formed on the light-extracting surface of the single-color light source.

According to one example of the present disclosure, the phosphor layer of the light providing device is formed on a color wheel, and the color wheel is positioned on the optical pathway of the single-color light source.

According to one example of the present disclosure, the single-color light source is a red light source, a green light source or a blue light source.

According to one example of the present disclosure, the single-color light source is a blue light source, and the wavelength of which is about 440-450 nm.

According to one example of the present disclosure, the phosphor layer comprises a phosphor material, and the chemical formula of which is $Ba_{1-x}Si_2O_2N_2:Eu_x$, wherein x is 0.001-1.

According to one example of the present disclosure, the phosphor layer comprises a phosphor material, and the chemical formula of which is $Ba_{1-x}Si_2O_2N_2:Eu_x$, wherein x is 0.005-0.03.

According to one example of the present disclosure, the phosphor layer to comprises a phosphor material, and the chemical formula of which is $Ba_{1-x}Si_2O_2N_2:Eu_x$, wherein x is 0.02-0.03.

According to one example of the present disclosure, the emission wavelength of the phosphor material is about 480-495 nm.

According to one example of the present disclosure, the thickness of the phosphor layer is about 50-300 μm.

According to one example of the present disclosure, the solid content of the phosphor material in the phosphor layer is about 5-30 wt %.

BRIEF DESCRIPTION OF THE DRAWINGS

For a more complete understanding of the present invention, and the advantages thereof, reference is now made to the following descriptions taken in conjunction with the accompanying drawings, in which:

FIG. 6A is a schematic view of a projection device according to one embodiment of the present disclosure;

FIG. 6B is a schematic view of a light providing device according to one embodiment of the present disclosure;

FIG. 6C is a schematic view of a light providing device according to one embodiment of the present disclosure;

DETAILED DESCRIPTION

Figure 1:
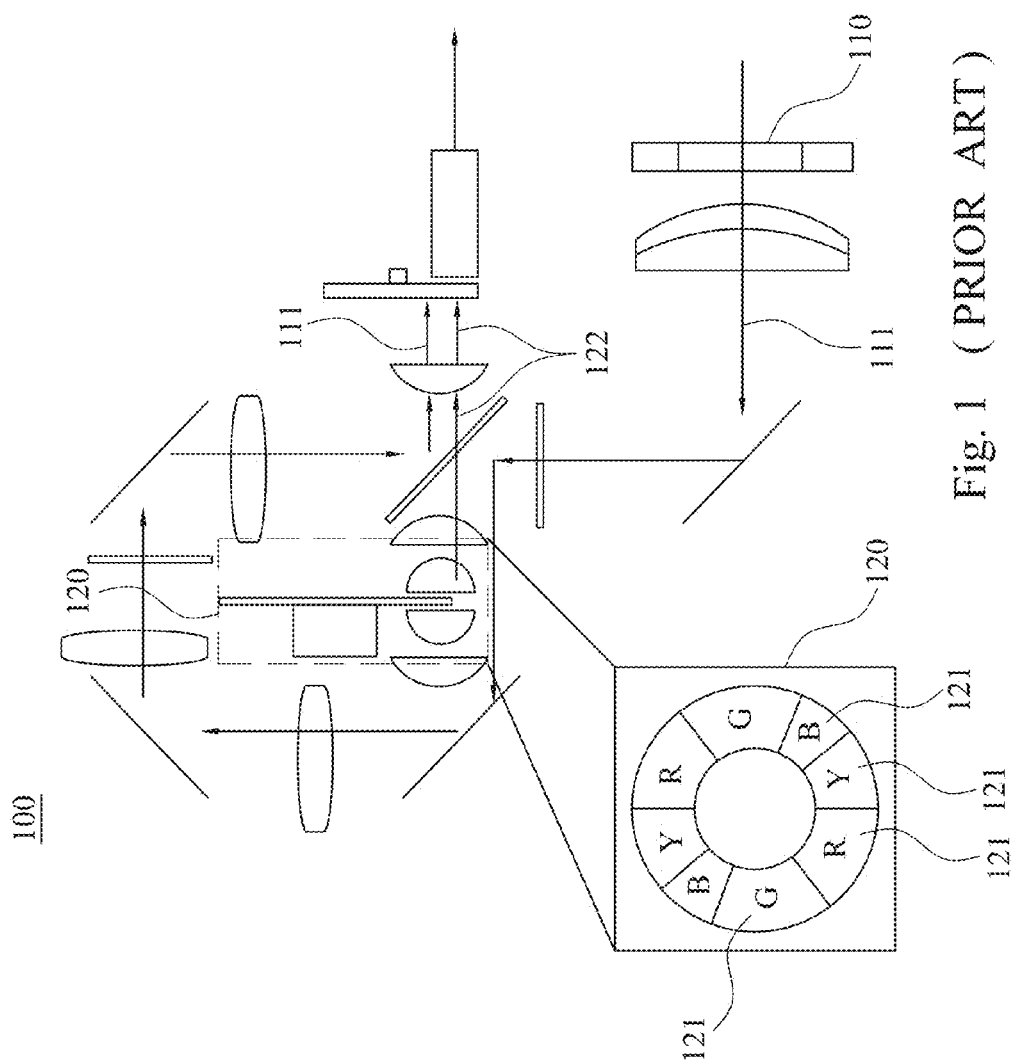
FIG. 1 is a schematic view of the conventional light module of a 445-nm laser project.
Figure 2A:
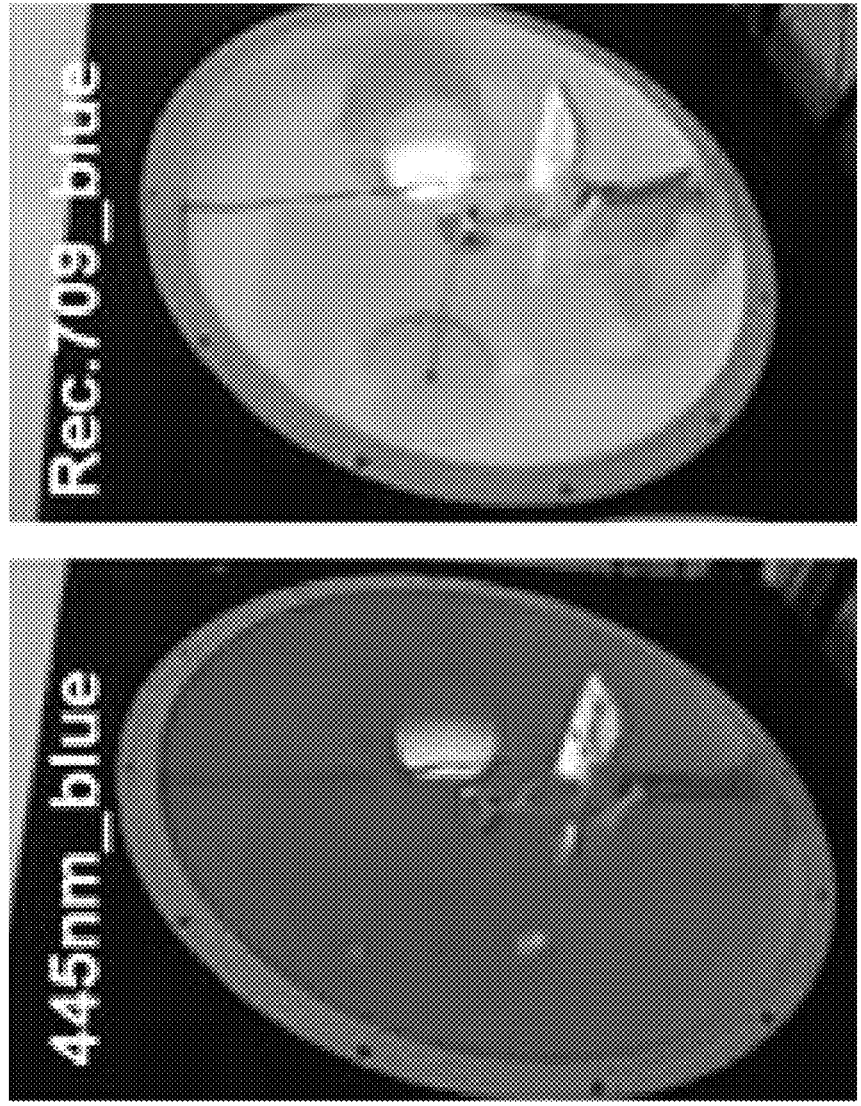
FIG. 2A is images of a conventional 445-nm blue light source (left) and the standard blue light source of Rec. 709 (right)
Figure 2B:
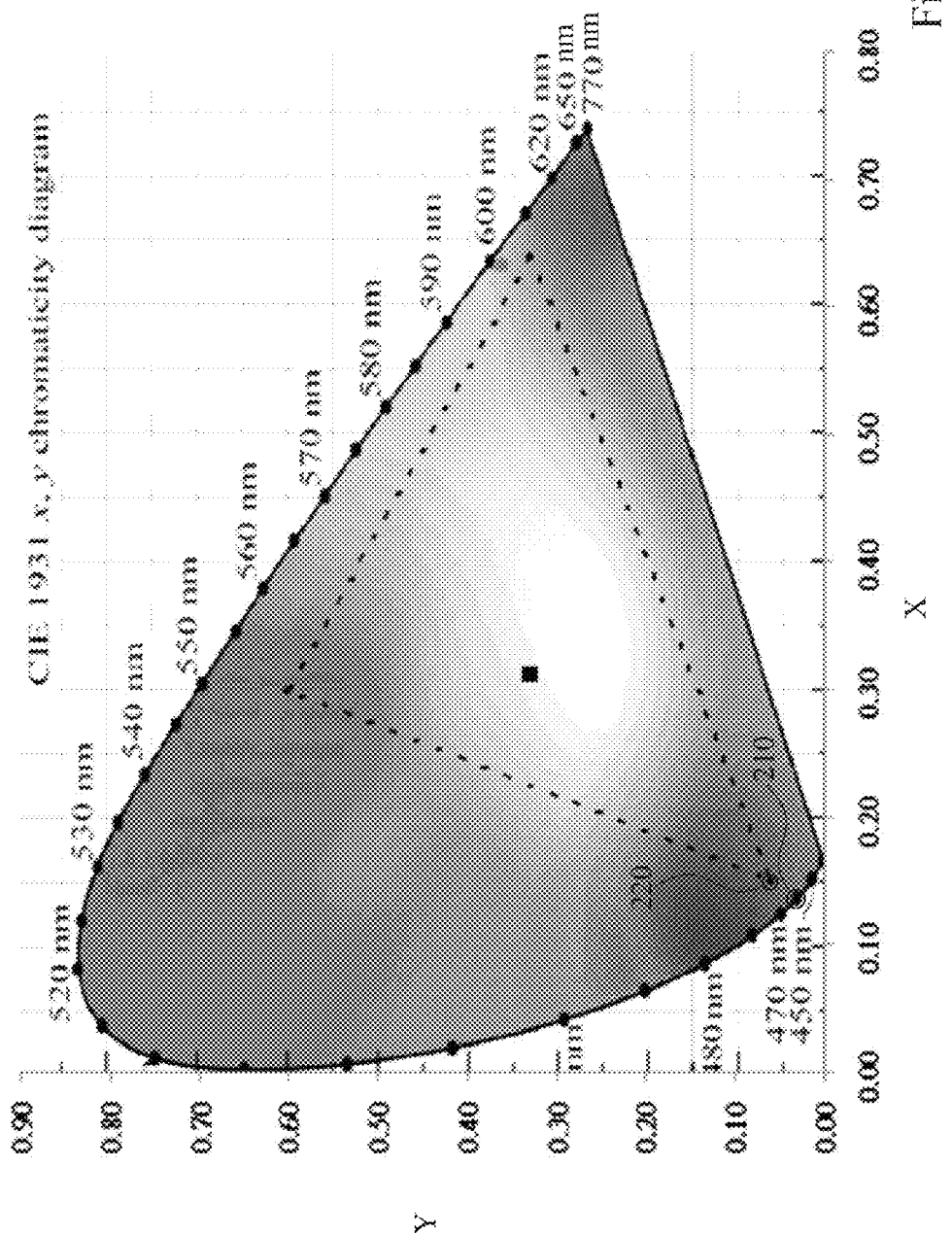
FIG. 2B is CIE coordinates of a conventional 445-nm blue light and the standard blue light of Rec. 709.

The embodiments of the embedded package structure and a method for manufacturing the same of the present disclosure are discussed in detail below, but not limited the scope of the present disclosure. The same symbols or numbers are used to the same or similar portion in the drawings or the description. And the applications of the present disclosure are not limited by to the following embodiments and examples which the person in the art can apply in the related field.

Figure 3:
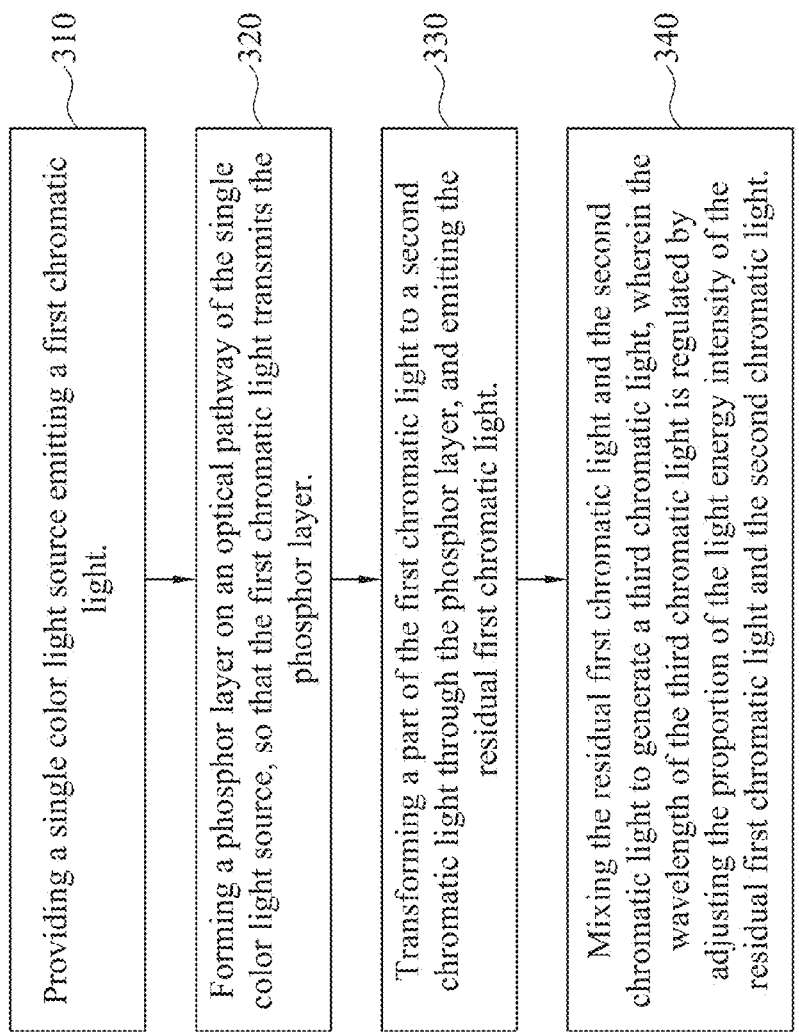
FIG. 3 is a flow chart of a method of regulating light wavelength for a projection device according to one embodiment of the present disclosure.

FIG. 3 is a flow chart of a method of regulating light wavelength for a projection device according to one embodiment of the present disclosure. In step 310 of FIG. 3, a single-color light source is provided, which emits a first is chromatic light. According to one embodiment of the present disclosure, the single-color light is a red light source, a green light source or a blue light source. According to one embodiment of the present disclosure, the single-color light source is a blue light source, and the wavelength of which is about 440-450 nm. According to one embodiment of the present disclosure, the single-color light source is a blue laser light source with 445 nm of wavelength.

In step 320, a phosphor layer is formed on the optical pathway of the single-color light source, so that the first chromatic light transmits the phosphor layer. According to one embodiment of the present disclosure, the phosphor layer comprises a phosphor material, and the chemical formula of which is $Ba_{1-x}Si_2O_2N_2:Eu_x$, wherein x is 0.001-1, preferred 0.005-0.03, and more preferred 0.02-0.03.

In step 330 of FIG. 3, after the first chromatic light transmits the phosphor layer, the phosphor layer may be excited by the first chromatic light, and emits a second chromatic light. The light transmitted through the phosphor layer include the second chromatic light and the residual first chromatic light. In which, because the second chromatic light is emitted by the phosphor layer absorbed the energy of the first chromatic light, the wavelength of the second chromatic light is longer than the wavelength of the first chromatic light.

According to one embodiment of the present disclosure, the second chromatic light transmitted through the phosphor layer and the residual first chromatic light enter the optical path of the projection device directly. According to one embodiment of the present disclosure, the second chromatic light transmitted through the phosphor layer and the residual first chromatic light is irradiate a reflective surface, and then enter the optical path of the projection device after reflection.

In step 340 of FIG. 3, the second chromatic light transmitted through the phosphor layer and the residual first chromatic light mix to generate a third chromatic light, wherein the wavelength of the third chromatic light is between the wavelength of the first and the second chromatic lights. The wavelength of the third chromatic light is regulated by adjusting the proportion of the luminous intensity of the residual first chromatic light and the second chromatic light. According to one embodiment of the present disclosure, the emission wavelength of the phosphor material is in a range of 490-495 nm, which is the wavelength range of the second chromatic light. According to one embodiment of the present disclosure, the wavelength of the third chromatic light is in a range of 440-495 nm.

A relationship formula may be given by the aforementioned conclusion, as the following formula 1:

$$C_1(WL_1) + C_2(WL_2) \rightarrow C_3(WL_3) \quad \text{(formula 1)}$$

wherein $WL_1$ is the wavelength of the first chromatic light; $WL_2$ is the wavelength of the second chromatic light; $WL_3$ is the wavelength of the third chromatic light; $WL_1 > WL_3 > WL_2$; and $C_1$, $C_2$, and $C_3$ are the luminous intensities of the first, the second, and the third chromatic lights, respectively.

Otherwise, according to the criterion drawn up by CIE, each one of chromatic lights may be corresponded to a CIE coordinate. In one embodiment of the present disclosure, the phosphor material, $Ba_{0.974}Si_2O_2N_2:Eu_{0.026}$, is used to form a phosphor layer, and to regulate the CIE coordinate of 445-nm blue light.

Table 1 concludes the CIE coordinates of the phosphor layer excited under the different luminous intensities of 445-nm blue light, wherein the phosphor layer has 10 wt % of the phosphor material, $Ba_{0.974}Si_2O_2N_2:Eu_{0.026}$, and the thickness of the phosphor layer is 50 μm.

| Luminous intensities (power) of 445-nm blue light | X axis | Y axis |
|---|---|---|
| 1 W | 0.1395 | 0.0592 |
| 4 W | 0.1395 | 0.0573 |
| 8 W | 0.1397 | 0.0541 |

On Table 1, the cyan phosphor material may have a CIE approaching (0.14, 0.06) by regulating the luminous intensities of blue light as 1 W, 4 W or 8 W. And the results have been highly closed to Rec. 709 coordinate (0.15, 0.06), the standard blue light. Therefore, a specific chromatic wavelength of a projection device may be efficiently regulated by the aforementioned method, so as to enhance color rendering of a projection device.

The following several embodiments are illustrated the excitation and emission spectra and CIE coordinates of different phosphor materials.

Figure 4A:
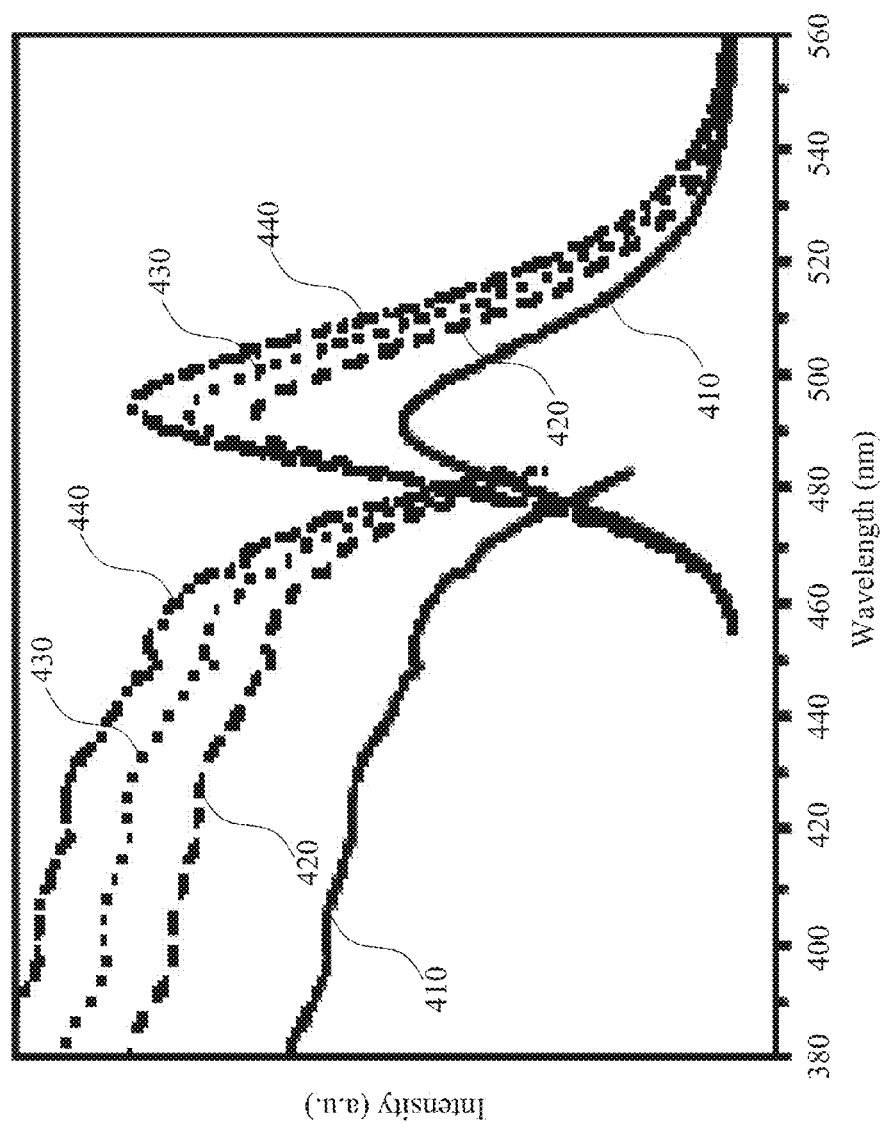
FIG. 4A is exciting and emitting spectra of phosphor materials according to one embodiment of the present disclosure.
Figure 4B:
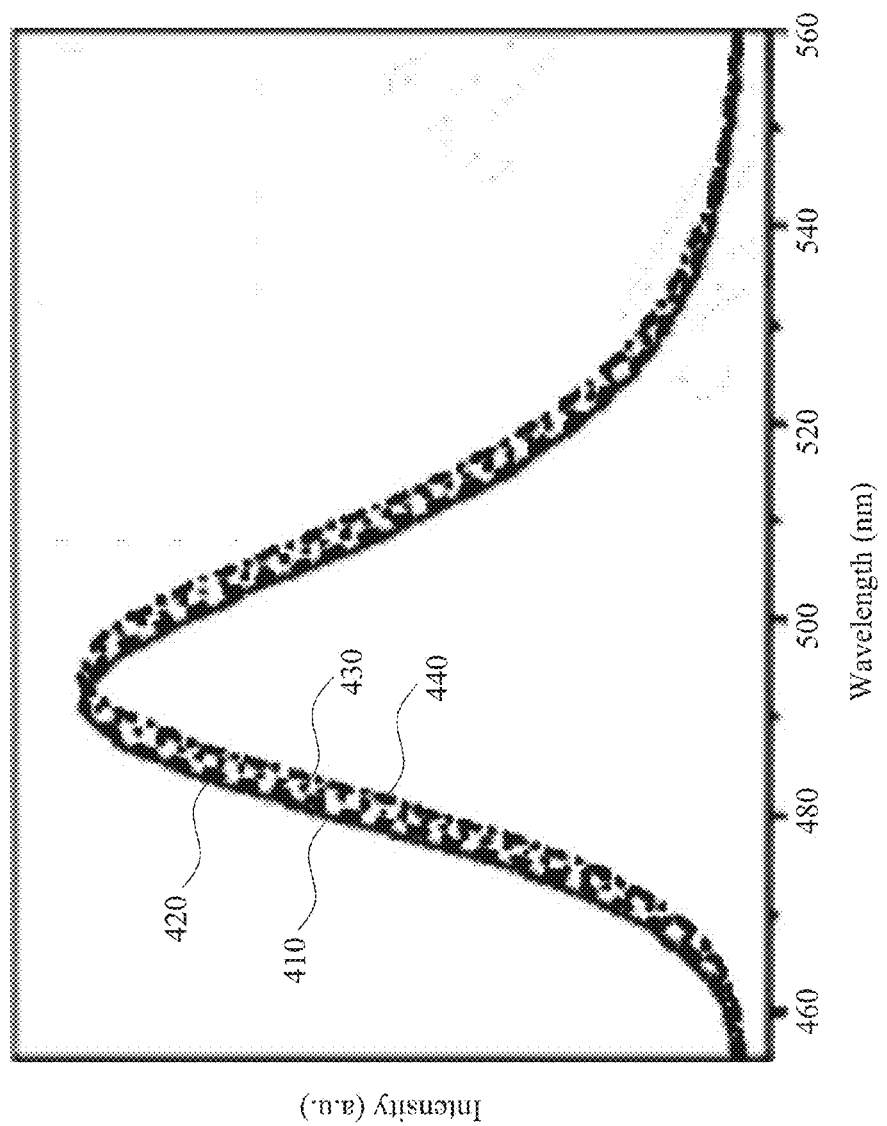
FIG. 4B is a normalized emitting spectrum of phosphor materials to according to one embodiment of the present disclosure.

FIG. 4A is exciting and emitting spectra of phosphor materials according to one embodiment of the present disclosure; and FIG. 4B is a normalized emitting spectrum of phosphor materials according to one embodiment of the present disclosure.

In FIG. 4A, the excitation and emission intensities of phosphor materials, $Ba_{0.995}Si_2O_2N_2:Eu_{0.005}$ (410), $Ba_{0.99}Si_2O_2N_2:Eu_{0.01}$ (420), $Ba_{0.98}Si_2O_2N_2:Eu_{0.02}$ (430) and $Ba_{0.97}Si_2O_2N_2:Eu_{0.03}$ (440), are compared to each other. At the same wavelength, excitation and emission intensities of $Ba_{0.97}Si_2O_2N_2:Eu_{0.03}$ (440) are both largest, and excitation and emission intensities of $Ba_{0.97}Si_2O_2N_2:Eu_{0.03}$ (440) are both lowest. The intensity order is $Ba_{0.97}Si_2O_2N_2:Eu_{0.03}$ $(440)>Ba_{0.98}Si_2O_2N_2:Eu_{0.02}$ $(430)>Ba_{0.99}Si_2O_2N_2:Eu_{0.01}$ $(420)>Ba_{0.995}Si_2O_2N_2:Eu_{0.005}$ $(410)$. In FIG. 4A, when the doped content of europium (Eu) is higher, the excitation and emission intensities of a phosphor material are both larger.

FIG. 4B is shown that the normalized emission spectra in FIG. 4A, so that the maximum of intensities are all the same. In FIG. 4B, the emission intensities of phosphor materials, $Ba_{0.995}Si_2O_2N_2:Eu_{0.005}$ (410), $Ba_{0.99}Si_2O_2N_2:Eu_{0.01}$ (420), $Ba_{0.98}Si_2O_2N_2:Eu_{0.02}$ (430) and $Ba_{0.97}Si_2O_2N_2:Eu_{0.03}$ (440), are compared to each other. At the same emission intensity, $Ba_{0.97}Si_2O_2N_2:Eu_{0.03}$ (440) has the longest emission wavelength, and the emission wavelength of $Ba_{0.995}Si_2O_2N_2:Eu_{0.005}$ (410) is shortest. The wavelength order is $Ba_{0.97}Si_2O_2N_2:Eu_{0.03}$ (440)>$Ba_{0.98}Si_2O_2N_2:Eu_{0.02}$ (430)> $Ba_{0.99}Si_2O_2N_2:Eu_{0.01}$ (420)>$Ba_{0.995}Si_2O_2N_2:Eu_{0.005}$ (410). In FIG. 4B, when the doped content of europium (Eu) is higher, the emission wavelength of a phosphor material is longer.

Table 2 concludes the CIE coordinates of phosphor materials according to embodiments of the present disclosure.

| europium content (Eu, %) | X axis | Y axis |
| --- | --- | --- |
| 0.5 | 0.0837 | 0.3984 |
| 1.0 | 0.0794 | 0.4155 |
| 2.0 | 0.0788 | 0.4388 |
| 3.0 | 0.0808 | 0.4623 |

Figure 5:
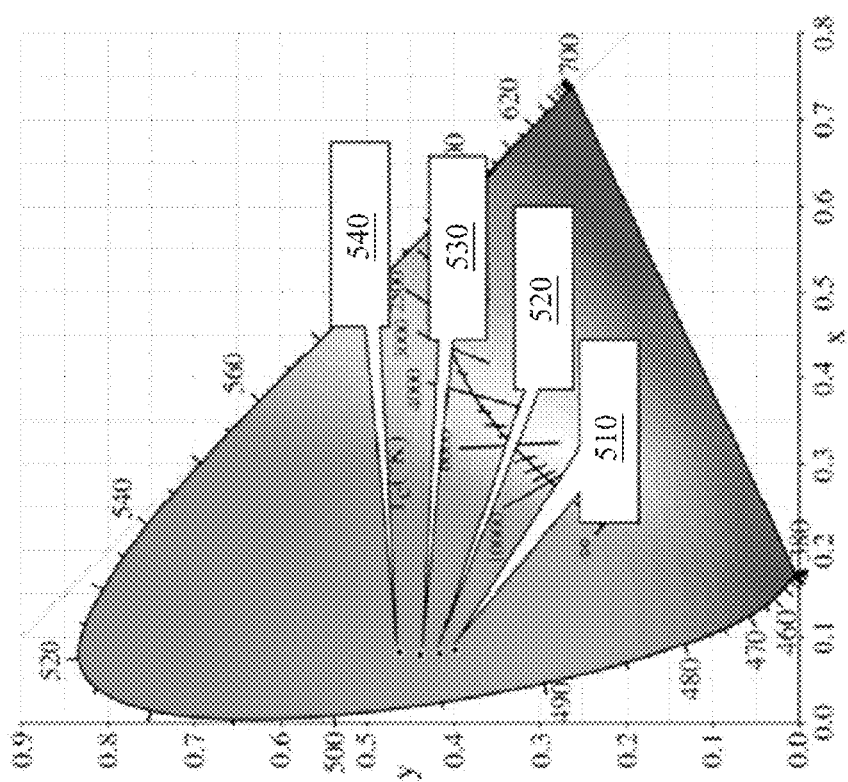
FIG. 5 is a CIE coordinate chart of phosphor materials according to one embodiment of the present disclosure.

FIG. 5 is a CIE coordinate chart of phosphor materials according to one embodiment of the present disclosure. In FIG. 5, the CIE coordinates of phosphor materials, $Ba_{0.995}Si_2O_2N_2:Eu_{0.005}$ (510), $Ba_{0.99}Si_2O_2N_2:Eu_{0.01}$ (520), $Ba_{0.98}Si_2O_2N_2:Eu_{0.02}$ (530) and $Ba_{0.97}Si_2O_2N_2:Eu_{0.03}$ (540), are indicated. Since $Ba_{0.995}Si_2O_2N_2:Eu_{0.005}$ (510) has the shortest emission wavelength, the CIE coordinate of $Ba_{0.995}Si_2O_2N_2:Eu_{0.005}$ (510) is closest to Rec. 709 coordinate. And, since $Ba_{0.97}Si_2O_2N_2:Eu_{0.03}$ (540) has the longest emission wavelength, the CIE coordinate of $Ba_{0.97}Si_2O_2N_2:Eu_{0.03}$ (540) is farthest to Rec. 709 coordinate. However, $Ba_{0.97}Si_2O_2N_2:Eu_{0.03}$ has the largest emission intensity by compared to phosphor materials of other embodiments, so $Ba_{0.97}Si_2O_2N_2:Eu_{0.03}$ is chosen to be the cyan phosphor material for regulating a blue light source. According to one embodiment of the present disclosure, the chemical formula of the cyan phosphor material may be $Ba_{0.974}Si_2O_2N_2:Eu_{0.026}$.

FIG. 6A is a schematic view of a projection device 600 according to one embodiment of the present disclosure. In FIG. 6A, the projection device 600 comprises a light providing device 610, a relay 620, a light modulator 630 and projection lens 640. In which, the light providing device 610 comprises a single-color light source 611 and a phosphor layer 612. According to one embodiment of the present disclosure, the thickness of the phosphor layer 612 is in a range of 50-300 μm. According to one embodiment of the present disclosure, the solid content of the phosphor material in the phosphor layer 612 is in a range of 5-30 wt %.

According to one embodiment of the present disclosure, the phosphor layer 612a of the light providing device 610a is formed on the light-extracting surface 613 of the single-color light source 611. In which, the phosphor layer may be coated on the inner side, outer side or the both of the light-extracting surface 613 of the single-color light source 611, as shown in FIG. 6B.

According to one embodiment of the present disclosure, the phosphor layer 612a of the light providing device 610a is formed on a color wheel 614, and the color wheel 614 is positioned on the optical pathway of the single-color light source 611, as shown in FIG. 6C.

In the best embodiment of the present disclosure, the cyan phosphor material, $Ba_{0.974}Si_2O_2N_2:Eu_{0.026}$, is used to regulate 455-nm blue light, wherein the thickness of the phosphor layer is 50 μm, and the solid content of the phosphor material is 10 wt %. By the aforementioned condition of the phosphor layer, the blue light coordinate may be regulated from (0.13, 0.03) to (0.14, 0.05), which is close to the standard blue light of Rec. 709.

Figure 7A:
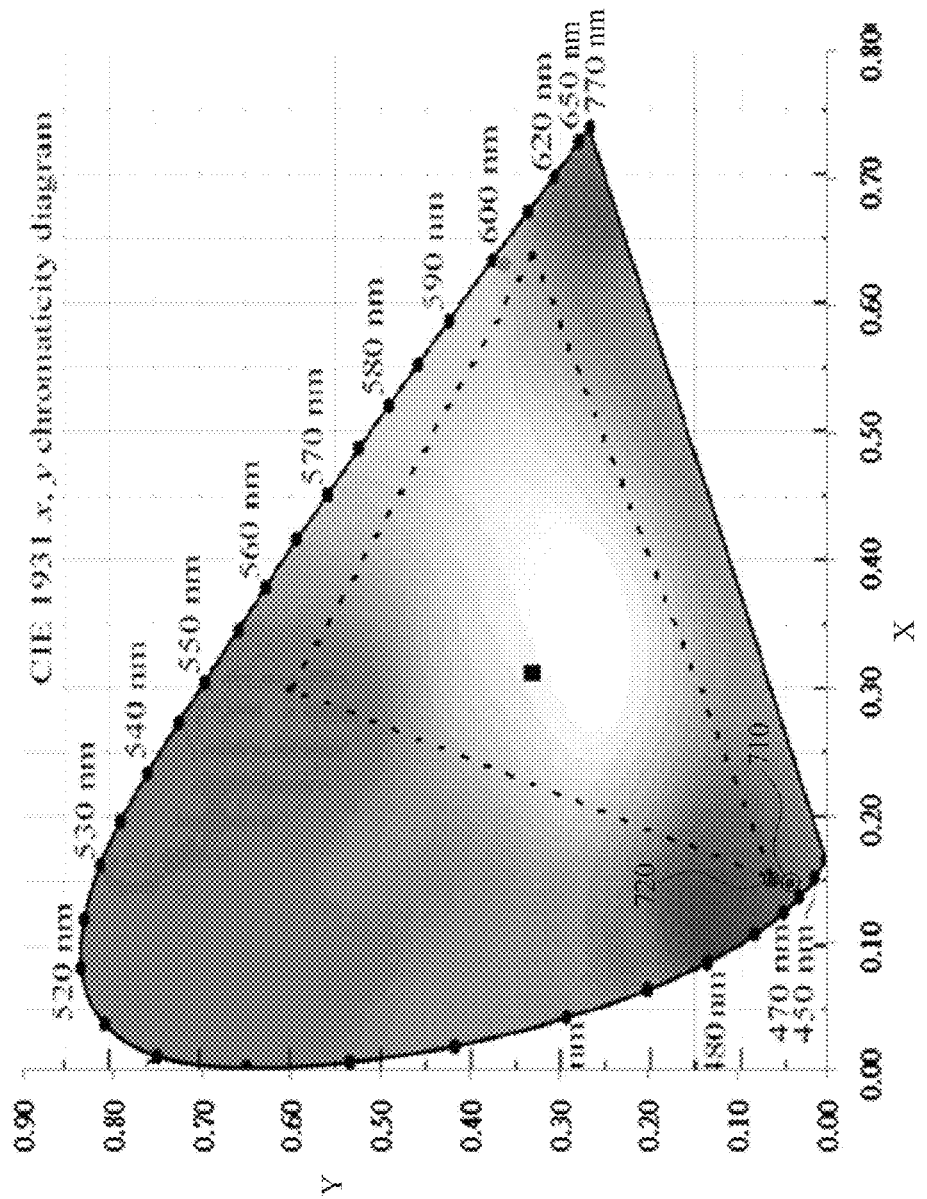
FIG. 7A is CIE coordinates of the standard blue light of Rec. 709 and the blue light regulated by a phosphor layer according to one embodiment of the present disclosure.
Figure 7B:
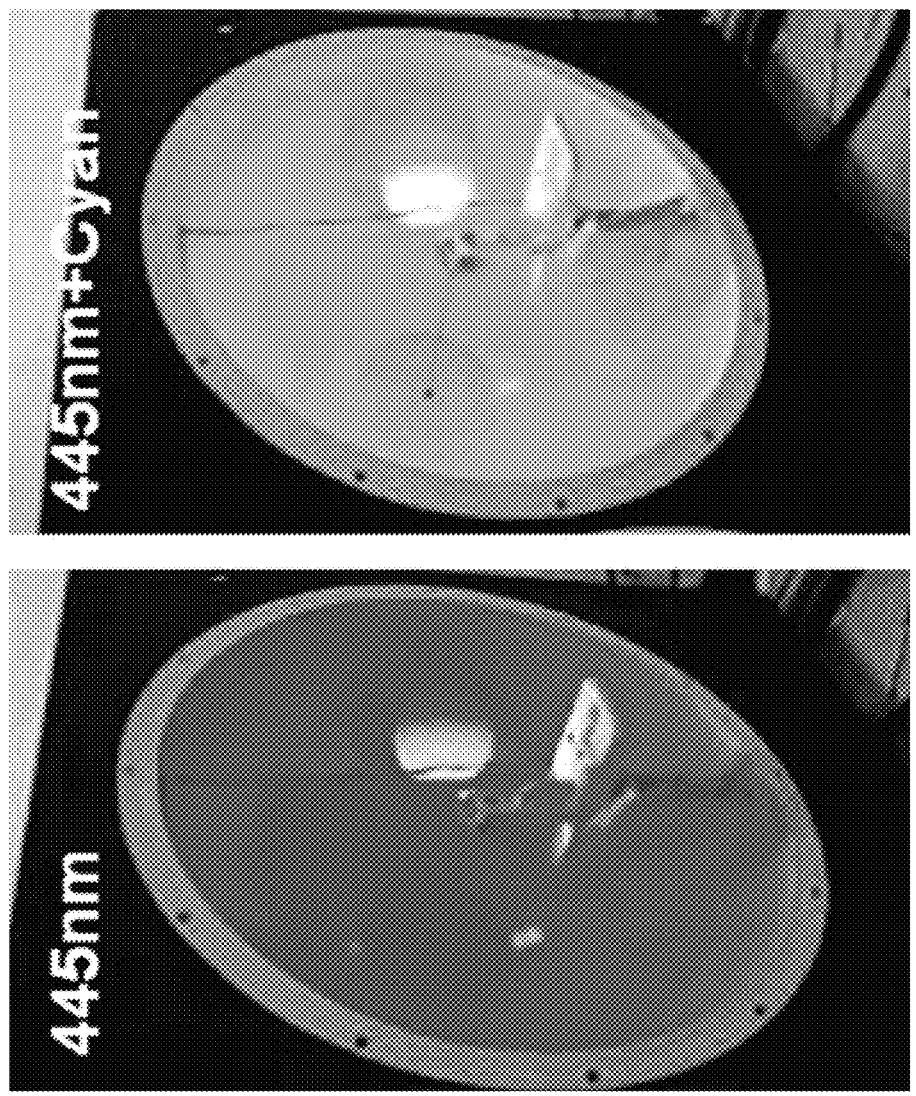
FIG. 7B is images of a conventional 445-nm blue light source (left) and the blue light source regulated by a phosphor layer according to one embodiment of the present disclosure.

FIG. 7A is CIE coordinates of the standard blue light of Rec. 709 and the blue light regulated by a phosphor layer according to one embodiment of the present disclosure. And FIG. 7B is images of a conventional 445-nm blue light source (left) and the blue light source regulated by a phosphor layer according to one embodiment of the present disclosure. In the CIE coordinates of FIG. 7A, the blue light 710 regulated by the phosphor layer has been approached the standard blue light 720 of Rec. 709. And the blue light source provided by one embodiment of the present disclosure is more similar to the blue light source of Rec. 709 by compared to the conventional 445-nm blue light source. In FIG. 7B, by compared to the conventional 445-nm blue light source (left), the blue light source provided by the best embodiment of the present disclosure (right) regulates the emitting wavelength and provides a blue light source closed to Rec. 709, in which the conventional 445-nm blue light transmits the phosphor layer.

By the method of one embodiment of the present disclosure, the first chromatic light of the single-color light source irradiates the phosphor layer, so as to transmit the second chromatic light and the residual first chromatic light. And the second chromatic light and the residual first chromatic light mix to generate the third chromatic light directly. Therefore, the additional filter does not be positioned, so as to reduce the product cost. And the optical path design of the original projection device does not be modified. It is worthwhile to note that the third chromatic light may efficiently regulate and approach the desired wavelength range by the aforementioned method. For example, the blue light may be close to the CIE coordinate of standard blue light of Rec. 709.

Although embodiments of the present disclosure and their advantages have been described in detail, they are not used to limit the present disclosure. It should be understood that various changes, substitutions and alterations can be made herein without departing from the spirit and scope of the present disclosure. Therefore, the protecting scope of the present disclosure should be defined as the following claims.

What is claimed is:

1. A method of regulating light wavelength for a projection device, comprising the steps of:
   providing a single-color light source emitting a first chromatic light;
   forming a phosphor layer on an optical pathway of the single-color light source, so that the first chromatic light transmits the phosphor layer, wherein the phosphor layer comprises a phosphor material, having a chemical formula of $Ba_{1-x}Si_2O_2N_2:Eu_x$, wherein x is 0.001-1;
   transforming a part of the first chromatic light to a second chromatic light through the phosphor layer, and emitting the residual first chromatic light, to wherein the wavelength of the second chromatic light is longer than the wavelength of the first chromatic light; and
   mixing the residual first chromatic light and the second chromatic light to generate a third chromatic light, wherein the wavelength of the third chromatic light is between the first and the second chromatic lights, and the wavelength of the third chromatic light is regulated by adjusting the proportion of the luminous intensity of the residual first chromatic light and the second chromatic light.

2. The method of claim 1, wherein the projection device comprises a light providing device, a relay, a light modulator, and a projection lens, wherein the light providing device comprises the single-color light source and the phosphor layer.

3. The method of claim 2, wherein the phosphor layer of the light providing device is formed on the light-extracting surface of the single-color light source.

4. The method of claim 2, wherein the phosphor layer of the light providing device is formed on a color wheel positioned on the optical pathway of the single-color light source.

5. The method of claim 1, wherein the single-color light source is a red light source, a green light source or a blue light source.

6. The method of claim 5, wherein the single-color light source is a blue light source, and the wavelength of which is about 440-450 nm.

7. The method of claim 1, wherein the phosphor layer comprises a phosphor material, having a chemical formula of $Ba_{1-x}Si_2O_2N_2:Eu_x$, wherein x is 0.005-0.03.

8. The method of claim 7, wherein the phosphor layer comprises a phosphor material, having a chemical formula of $Ba_{1-x}Si_2O_2N_2:Eu_x$, wherein x is 0.02-0.03.

9. The method of claim 1, wherein the emission wavelength of the phosphor material is about 480-495 nm.

10. The method of claim 1, wherein the thickness of the phosphor layer is about 50-300 μm.

11. The method of claim 1, the solid content of the phosphor material in the phosphor layer is about 5-30 wt %.

* * * * *